United States Patent
Ameye (10) Patent No.: US 7,219,487 B2
(45) Date of Patent: May 22, 2007

(54) AGRICULTURAL HARVESTING MACHINES AND FRONT ATTACHMENTS THEREFOR

(75) Inventor: Danny Roger Ameye, Zonnebeke (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/030,631

(22) Filed: Jan. 6, 2005

(65) Prior Publication Data
US 2006/0090444 A1 May 4, 2006

Related U.S. Application Data

(63) Continuation of application No. 10/250,584, filed on Jul. 3, 2003, now Pat. No. 6,895,734.

(30) Foreign Application Priority Data
Jan. 22, 2001 (GB) ................................ 0101557.7

(51) Int. Cl.
*A01D 41/127* (2006.01)
(52) U.S. Cl. ................. 56/10.2 H; 56/10.2 G
(58) Field of Classification Search ................ 56/10.8, 56/10.9, 11.1, 11.2, 11.9, 13.5, 14.5, 51, 219, 56/16.4 R, 16.6, 10.2 R, 10.2 G, 10.2 H, 56/14.1, 14.3, DIG. 15; 460/6
See application file for complete search history.

(56) References Cited

U.S. PATENT DOCUMENTS

| | | | | |
|---|---|---|---|---|
| 3,589,109 A | * | 6/1971 | Payne | ............... 56/10.2 R |
| 3,945,175 A | | 3/1976 | Barkstrom et al. | |
| 3,999,613 A | * | 12/1976 | Porter | ............... 171/14 |
| 4,044,557 A | | 8/1977 | Stoessel et al. | |
| 4,171,606 A | | 10/1979 | Ziegler et al. | |
| 4,296,409 A | * | 10/1981 | Whitaker et al. | ......... 340/684 |
| 4,419,856 A | * | 12/1983 | Taylor | ............... 56/1 |
| 4,476,667 A | | 10/1984 | Moss | |
| 4,487,002 A | | 12/1984 | Kruse et al. | |
| 4,567,719 A | | 2/1986 | Soots et al. | |
| 5,524,424 A | * | 6/1996 | Halgrimson et al. | ..... 56/10.2 D |
| 5,527,218 A | * | 6/1996 | Van den Bossche et al. | . 460/20 |

(Continued)

FOREIGN PATENT DOCUMENTS

DE 19606388 8/1997

(Continued)

*Primary Examiner*—Thomas B. Will
*Assistant Examiner*—Alicia Torres
(74) *Attorney, Agent, or Firm*—Michael C. Horms; John William Stader; Stephen A. Bucchianeri (57) ABSTRACT

An agricultural harvesting machine includes a first gathering element adapted to be driven by a first drive mechanism so as to gather crop and feed the crop in a direction substantially opposite to a direction of motion of the harvesting machine. A second gathering element is adapted to receive the crop from the first gathering element and is further adapted to be driven so as to transfer the crop in a direction substantially transverse to the direction of motion. Intake elements are adapted to receive the crop from the second gathering element. The second gathering element and intake elements are adapted to be driven at related rates. The first gathering element is driveable at a rate independent from a driven rate of the second gathering element and the intake elements.

16 Claims, 4 Drawing Sheets

U.S. PATENT DOCUMENTS

| | | |
|---|---|---|
| 5,791,128 A | 8/1998 | Rogalsky |
| 5,822,959 A | 10/1998 | Norton |
| 6,247,296 B1 | 6/2001 | Becker et al. |
| 6,430,905 B2 | 8/2002 | Eis et al. |
| 6,775,966 B2 * | 8/2004 | Frego .................. 56/10.9 |
| 6,895,734 B2 * | 5/2005 | Ameye .................. 56/10.8 |

FOREIGN PATENT DOCUMENTS

| | | |
|---|---|---|
| EP | 0860106 | 8/1998 |
| EP | 0680687 | 7/2000 |
| EP | 1046334 | 6/2001 |
| EP | 1151660 | 11/2001 |
| GB | 911361 | 11/1962 |
| NL | 263620 | 4/1961 |
| WO | WO 02/056672 A1 | 7/2002 |

\* cited by examiner

AGRICULTURAL HARVESTING MACHINES AND FRONT ATTACHMENTS THEREFOR

CROSS REFERENCE AND INCORPORATION OF RELATED APPLICATIONS

The present patent application is a Continuation of, and claims priority (35 U.S.C. 120) to, application Ser. No. 10/250,584, filed Jul. 3, 2003 now U.S. Pat. No. 6,895,734 issued May 24, 2005, and which is hereby incorporated herein by reference.

TECHNICAL FIELD OF THE INVENTION

The present invention relates to agricultural machinery and in particular to agricultural harvesting machines, front/header attachments therefor and to arrangements for operating the same.

BACKGROUND OF THE INVENTION

Some pieces of agricultural equipment known in the art as forage harvesters and combine harvesters are used to collect and process crop material from a field. Generally, such agricultural harvesting machines are equipped with crop material cutting and/or collecting devices, such as maize, corn or grain cutting headers or pick-up units for picking up e.g. hay, grass or straw off the ground. In addition to such initial gathering operations, the machines are also provided with second-stage gathering means for transferring crop material and include intake elements for taking in harvested/gathered crop material and feeding it to further crop processing means of the harvesting machine.

In a forage harvester, for example, the intake elements usually comprise a set of feedrolls which take in harvested crop material and feed it to a cutterhead, which is part of the further crop processing means. The rotating cutterhead co-operates with a fixed shear bar, operable to chop up the crop material fed thereto by the feedrolls. With grass-like materials which are kernel-free it is sufficient to slit the crop material, e.g. the stems of the plants are cut to length using a cutterhead such as a rotary knife drum. When cutting maize, the cobs may be slit into smaller size by the cutterhead, and it is preferred if the majority of the kernels are broken or cracked, which is needed in order to facilitate the complete digestion of the crop material, including the maize kernels, by farm animals. Therefore a compressor roll assembly, a set of closely adjacent, co-operating compressor rolls with fluted surfaces, may be provided for cracking the chopped crop material. The comminuted/processed crop material is then propelled by a blower or accelerator out of the harvester through a spout, directing the material flow into a temporary container moved behind or aside the forage harvester, before being stored and eventually being foddered to livestock.

In a combine harvester, for example, the intake elements generally comprise a straw elevator, which feeds the crop material to the crop processing means comprising threshing means, including one or more threshing drums, further separation means, such as straw walkers, and cleaning means, including sieves and a ventilator, operable to remove impurities such as chaff and pieces of straw from the grain kernels.

In use, in order to harvest crop material, an agricultural harvesting machine is provided at its front side with a front attachment comprising a first gathering element for gathering crop material and feeding it in a direction opposite to the direction of motion of the forage harvester, and a second gathering element for transferring crop in a direction transverse to the direction of motion towards an intake mouth of the forage harvester. The first gathering element may be a crop material cutting and/or collecting device, such as for example a row dependent cutting means as known in the art, a row independent cutting means as described in EP-0 860 106, or a windrow pick-up device. The second gathering element is the transferring means for transferring the gathered crop material to an intake mouth of the harvesting machine, the intake mouth generally being of a smaller width than the second gathering element. The intake mouth is generally smaller width than the width of the first gathering element so the gathered crop must be brought more towards the longitudinal axis of the machine. The second gathering element may be, for example, an auger or a combination of vertical take-over drums as described in EP-0 860 106. The first gathering element collects and/or picks up crop material, and the second gathering element conveys the crop material to the intake mouth at the front part of the forage harvester.

The length to which crop material is cut depends on the conveyance speed of the feedrolls and on the speed of the cutterhead.

Generally on current forage harvesters the relationship between the speed of the second gathering element and the speed of the intake elements is not fixed since there is no fixed connection between each other. In most cases, the operator has to change the speed of the second gathering element by changing sprockets or gears whenever he/she chooses another speed of the intake elements. The right relationship between the speed of the second gathering element and the speed of the intake elements is very important for efficient feeding/crop throughput, good machine capacity and good quality of chop, especially in the case of a forage harvester. Since the front attachment and intake elements are generally not connected to each other on the current machines, the right relation can sometimes only be approximated.

U.S. Pat. No. 3,945,175 describes a feedroll drive mechanism for forage harvesters wherein a hydrostatic transmission is used to vary the length of cut of crops processed by the chopping mechanism. The hydrostatic transmission drives both the feedroll mechanism and the forwardly located gathering mechanism of the harvesting unit, such that the relative speeds of the crop gathering unit and the feedrolls remain unchanged.

Generally, the first gathering element (like the reel on a pick-up and the chains and rotors on corn-headers) and the second gathering element are driven by the same header attachment input shaft. Connecting this input shaft to the feedroll drive as in U.S. Pat. No. 3,945,175 makes the speed of the second gathering element and also the speed of the first gathering element vary together with the feedrolls.

With a forage harvester, when crop material is fed to the feedrolls at a too high speed (speed of the second gathering element higher than the speed of the feedrolls), a plug of material is formed in front of the feedrolls, which hampers the crop flow and causes material to be unevenly cut. If the speed of the second gathering element is lower than the speed of the feedrolls, material may be grasped by the feedrolls and torn apart. Here again, an irregular length of cut is obtained at the cutterhead, while in both cases a stationary length of cut is desired. Also when picking up e.g. hay, grass or straw, problems can be caused due to the speed of the second gathering element compared to the speed of the feedrolls: if the speed of the second gathering element is too low, material will pass below it and will be lost; if the speed of the second gathering element is too high, hay will be pushed forward. Here again, an irregular length of cut will be obtained.

In U.S. Pat. No. 4,044,557 an arrangement is disclosed in which feed-rolls are provided with an automatic speed control that increases the speed of the rollers when they are moved apart by humps of crop material in order to rid themselves of larger than normal slugs. Separate hydraulic pumps are provided for driving the feed-rolls and a standing crop cutter, although in each embodiment the two pumps are operably connected to each other between their respective control levers by a lost motion linkage. Although their control levers are not necessarily swung uniformly, they are coupled and are swung in unison.

It is an object of the present invention to provide improved agricultural machinery. It is a further object of the present invention to provide improved front/header attachments for agricultural machines, and improved arrangements and methods for operating the same.

SUMMARY OF THE INVENTION

The present invention provides an agricultural harvesting machine comprising:
a) a first gathering element adapted to be driven by a first drive mechanism so as to gather crop and to feed said crop in a direction substantially opposite to a direction of motion of said harvesting machine;
b) a second gathering element adapted to receive said crop from said first gathering element and adapted to be driven so as to transfer said crop in a direction substantially transverse to said direction of motion; and
c) intake elements being adapted to receive said crop from said second gathering element;

wherein said second gathering element and said intake elements are adapted to be driven at related rates and said first gathering element is driveable at a rate independent from a driven rate of said second gathering element and said intake elements. The first gathering element may be driven at a rate either faster or slower than the second gathering element.

A crop processing device is usually adapted to be fed with crop from said intake elements. The present invention is based on the finding that although the speed of the second gathering element should be related to the speed of the intake elements for the crop processing device, this is not necessary for the speed of the first gathering element.

Said first drive mechanism may comprise a continuously variable speed drive. The continuously variable speed drive may be in the form of a hydrostatic transmission.

Said second gathering element and said intake elements may be adapted to be driven by a second drive mechanism through a common transmission. Said common transmission may split a drive input from said second drive mechanism into a first output drive supplied to said intake elements and a second output drive supplied to said second gathering element, said split preferably being made in a substantially fixed ratio. Said drive input may be split in a ratio at which a rate of operation of said second gathering element is matched to a predetermined rate of crop throughput of said intake elements.

Each said drive mechanism may comprise a motor and the power supply to each said motor may be independent of the power supply to the other said motor. Each said motor may comprise a hydraulic motor and each said power supply may comprise a hydraulic drive pressure supplied from an operably independent pump stage, for example from separate hydraulic pumps driven by a common prime mover.

Said machine may further comprise a control unit adapted to vary the rate at which said first gathering element is driven in dependence on an operating condition of said machine. A said operating condition may comprise a ground speed of said machine. A said operating condition may comprise a speed of operation or crop throughput capacity of at least one of said second gathering element and said intake elements. A said operating condition may comprise a load on at least one of said second gathering element and said intake elements, such as for example a load imposed by crops being passed therethrough.

Said machine may comprise a forage harvester or a combine harvester. A forage harvester in accordance with the present invention may be self-propelled or may be towable by e.g. a tractor.

The present invention also provides a header attachment for an agricultural harvesting machine, said header comprising:
a) a first gathering element adapted to be driven so as to gather crop and to feed said crop in a direction substantially opposite to a direction of motion of a harvesting machine equipped with said header; and
b) a second gathering element adapted to receive crop gathered by said first gathering element and to be driven so as to transfer said gathered crop in a direction substantially transverse to said direction of motion and towards intake elements of said machine;

said header being characterized in that said first gathering element is driveable at a rate that is independent from a rate at which said second gathering element is driven. It should be noted that the term header is used to refer to attachments for agricultural machines which are generally fitted in use to the front end of the machine with respect to its usual direction of travel while harvesting and may also be referred to as front attachments.

Said first gathering element may by adapted to be driven by a first drive mechanism in the form of a continuously variable speed drive. The continuously variable speed drive may include a motor, which may furthermore be part of a hydrostatic transmission.

Said second gathering element may be adapted to be driven by a second drive mechanism through a transmission shared with one or more driveable said intake elements.

Some constituent parts of said first and second drive mechanisms may be mounted on said header, whilst others may be mounted on said machine.

Said first gathering element may comprise a rotatable pick-up reel comprising a series of pick-up tines for collecting cut crops and said second gathering element may comprise a transverse auger.

The present invention also provides an agricultural harvesting machine or a header attachment according to the invention, adapted in particular for row-independent harvesting, wherein said first gathering element comprises a set of rotatable cutting and conveying devices and wherein said second gathering element comprises a transverse auger or a set of rotatable conveying devices. In one variation, the rotatable conveying devices may comprise a moving belt arrangement.

The present invention also provides an agricultural harvesting machine or a header attachment according to the invention, adapted in particular for row-dependent harvesting, wherein said first gathering element comprises a plurality of row units provided with forward facing knives and chain conveyors adapted to convey cut crops in a direction opposite to a direction of motion and wherein said second gathering element comprises a transverse auger.

The present invention also provides a method of operating an agricultural harvesting machine or a header attachment thereof, including:

a) using a first gathering element to gather crop and to feed said crop in a direction substantially opposite to a direction of motion along the ground of said first gathering element;

b) receiving said crop from said first gathering element at a second gathering element and driving said second gathering element so as to transfer said crop in a direction substantially transverse to said direction of motion; and c) driving said first gathering element at a rate that is independent from a rate of driving said second gathering element.

The method may include driving said first gathering element by means of a continuously variable speed drive, whereby the rate at which said crop is gathered by said first gathering element is variable with respect to the rate at which said crop is transferred in said transverse direction.

Preferably, the speed of the first gathering element varies, within particular limits, in relation to the forward speed of the harvesting machine. For instance, on a pick-up attachment comprising as a first gathering element a rotatable pick-up reel carrying pick-up tines for lifting up or gathering cut grass, hay or straw from the field and as a second gathering element a transverse auger, a minimum speed of the pick-up reel should always be maintained, even at standstill, to enable the reel to pick up crop that has been thrown in front of the machine after reversing the feedrolls. This operation may be needed to clear the machine after detecting a foreign, e.g. metal object or plugging of the feedrolls. It may still be advantageous for the driver to be able to adjust the speed of the first gathering element independently of the instantaneous forward speed of the machine, e.g. when picking up short grass. Then the travelling speed may be high to obtain a high harvesting capacity, while the speed of the first gathering element is preferably relatively low to have a better "raking" effect on the crop on the field. This is because short grass does not behave as an interwoven "carpet" which is pulled into the machine. On row-independent headers, comprising as a first gathering element a plurality of row units provided with forward knives (front rotors) and chain conveyors, and comprising as a second gathering element a transverse auger, the speed of the front rotors should be kept nominal within a tolerance range of +/−25%, because too high a circumferential speed makes maize cobs break off the stalks before the crop reaches the second gathering element. Part of these loose cobs are lost in the field. Maize fields with a lot of grass or weed between the maize plants require a higher than nominal speed (+15%) to ensure that the grass or weeds are properly cut. Under such circumstances an adaptive speed control for the first gathering element may be advantageous, by which the rate of operation of the first gathering element may be varied or adjusted to reflect current or past operation. Where a row-independent header is used to harvest "whole crop" (stems and ears of the grain), the row-independent header comprising as a first gathering element a forward set of rotative cutting and conveying devices, and as a second gathering element a transverse auger or a rearward set of rotative conveying devices, a higher than nominal speed (+25%) is equally required and the adaptive speed control can be used to ensure a proper crop cut.

The first gathering element may be a crop material cutting and/or collecting device, such as a maize (corn) or grain cutting header or a pick-up unit for picking up e.g. hay off the ground. The second gathering element may be for example an auger or a combination of vertical take-over drums for transferring crop material to the intake mouth of the harvesting machine.

The second gathering element may be driven mechanically via a power-take-off (PTO), which may be internal or from a tractor. The mechanical drive may be connected to the drive of the intake elements, or connected hydraulically with an electro-hydraulic connection to the intake elements. In the first case one hydraulic motor is used for driving the intake element and the second gathering element. In the second case, a hydrostatic drive is provided for the intake element and a separate drive system for the second gathering element. Both drive systems are, however, connected to each other with regard to their control such that the second gathering element and the intake elements may be driven at related rates. The coupling between the intake element and second gathering element can be done in two ways. A first possibility is to couple both only with regard to the speed of rotation, in that a set length of cut (and thus a set speed of the intake elements, as the cutterhead has a fixed speed) automatically sets the speed of the second gathering element. A second possibility is to couple both with regard to the load on the intake elements and the second gathering element. In this case, the coupling between the drive mechanism of the intake element and the drive mechanism of the second gathering element is done by measuring both loads, comparing these loads and controlling accordingly. For each application there often exists an optimum distribution of power towards the intake element and the second gathering element.

The present invention also includes a method of operating an agricultural harvesting machine having a forward end in the direction of the motion of the harvesting machine, comprising the steps of: gathering crop from a field and feeding it in a direction opposite to the direction of motion of the harvesting machine, transferring crop in a direction transverse to the direction of motion towards an intake mouth of the harvesting machine, receiving the crop at the intake mouth from the second gathering element and feeding the crop into a crop processing device, and continuously adjusting the speed of the gathering step independent of the speed of the transferring step.

The present invention also includes an agricultural harvesting machine front attachment comprising a first gathering element for gathering crop and feeding it in a direction opposite to the direction of motion of the harvesting machine, and a second gathering element for transferring crop in a direction transverse to the direction of motion towards an intake mouth of the harvesting machine. It comprises a first input shaft for driving the first gathering element, and a second input shaft for driving the second gathering element, whereby the first and the second input shaft are adapted to be driven by separate drive systems. Preferably, the first input shaft is for connection to a continuous variable speed drive, whereby this connection is preferably a removable drive connection. According to another preferred embodiment, the second input shaft is intended to be driven by a drive system also driving an intake element of the harvesting machine. Also at the second input shaft preferably a removable drive connection is provided.

Although there has been constant improvement, change and evolution of agricultural harvesting machines, the present concepts are believed to represent substantial and novel improvements that depart from prior practices, resulting in the provision of more efficient and reliable devices of this nature. The used power is spread over all feeder means, whereby no element is pushing or pulling more than another, which results in a smoother feeding, allowing higher input speeds on the harvesting machine and higher handling capacity.

Other features and advantages of the present invention will become apparent from the following detailed description, taken in conjunction with the accompanying drawings, which illustrate by way of example only the principles of the invention.

In the different drawings, the same reference figures refer to the same or analogous elements.

DESCRIPTION OF THE ILLUSTRATIVE EMBODIMENTS

The present invention will be described with reference to an embodiment of a forage harvester and to certain drawings but the invention is not limited thereto but only by the claims. The drawings are schematic. The terms "front", "rear", "forward", "rearward", "right" and "left" used throughout the specification are determined with respect to the normal direction of movement of the machine in harvesting operation, as indicated by arrow M on FIG. 1, and are not to be construed as limiting terms.

Figure 1:
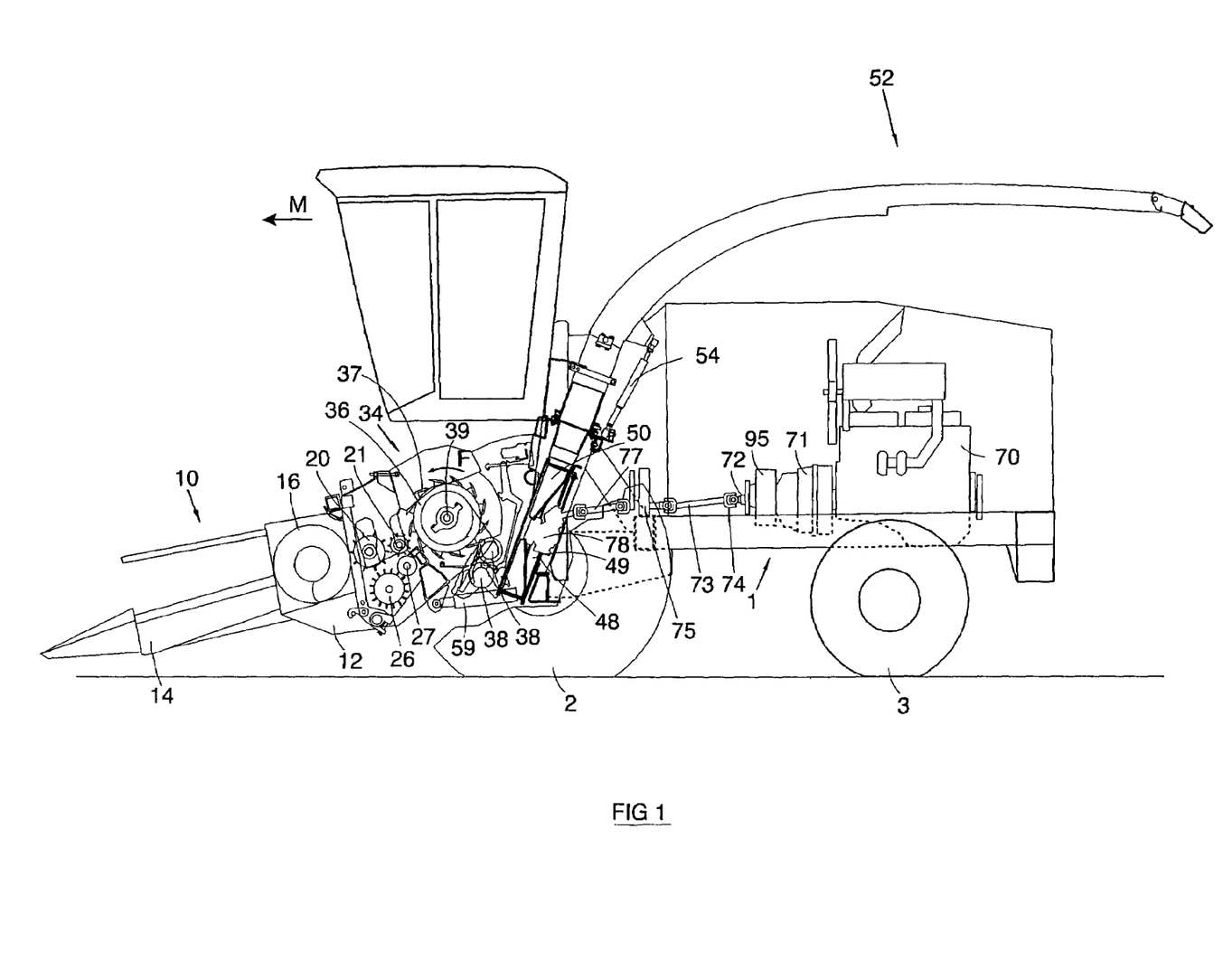
FIG. 1 is a side elevational view of a forage harvester, comprising a front attachment/header unit mounted to a main frame.

With reference to the drawings and more particularly to FIG. 1, there is shown a forage harvester having a main frame 1 on which are mounted ground engaging traction wheels 2 and steering wheels 3. The forage harvester is shown equipped with a crop collecting apparatus/header, in the form of a row crop header attachment 10, suitable for the harvesting of maize, but which can be replaced with a conventional windrow pick-up device or a conventional cutter bar attachment, depending on the type of crop to be harvested. Customarily, the row crop attachment 10 comprises an attachment frame 12, which supports a plurality of row crop units 14, operable to harvest maize stalks from the field and to convey the same rearwardly to an auger 16, which in turn delivers the crop material to the bite of feeding means installed in a front unit of the forage harvester.

The feeding means of the forage harvester comprises intake elements including a lower feeder means, which lower feeder means has a forward lower feedroll 26 and a smooth rear lower feedroll 27. The intake elements also include upper feeder means, including a forward upper feedroll 20 and a rear upper feedroll 21. The lower feedrolls 26, 27 are rotatably mounted in a lower feeder frame and the upper feedrolls 20, 21 are mounted in an upper feeder frame, to which the row crop attachment 10 is attached. The upper and lower feeder means rotate to convey the crop material in-between to a cutterhead 36, which comprises a plurality of knives 37, generating a cylindrical peripheral shape or profile when the cutterhead 36 is rotated.

During normal harvesting operation, when the cutterhead 36 is rotated in its normal operation sense, as indicated by arrow F in FIG. 1, the knives 37 co-operate with a fixed shear bar to cut the crop material to length. Additionally, a crop processor roll assembly is provided comprising a set of counter-rotating compressor rolls 38, 38' mounted therein, which rolls crack the whole kernels which are left in the chopped material. The two counter-rotating compressor rolls 38, 38' may have a substantially cylindrical, fluted surface. The cutter head 36 projects the cut material into the bite of the compressor roll assembly. This delivers the crushed maize kernels to a blower rotor 49 that is installed within a blower housing 48. The blower rotor 49 comprises a plurality of paddles 50, which throw the material upwardly through the blower or accelerator outlet into a discharge spout 52, which can be positioned by an operator to direct the cut crop material as required, normally into a wagon which is moving alongside or behind the forage harvester. The spout 52 is pivoted vertically by a hydraulic cylinder 54, which is mounted between the top of the blower housing 48 and the underside of the spout 52.

Figure 2:
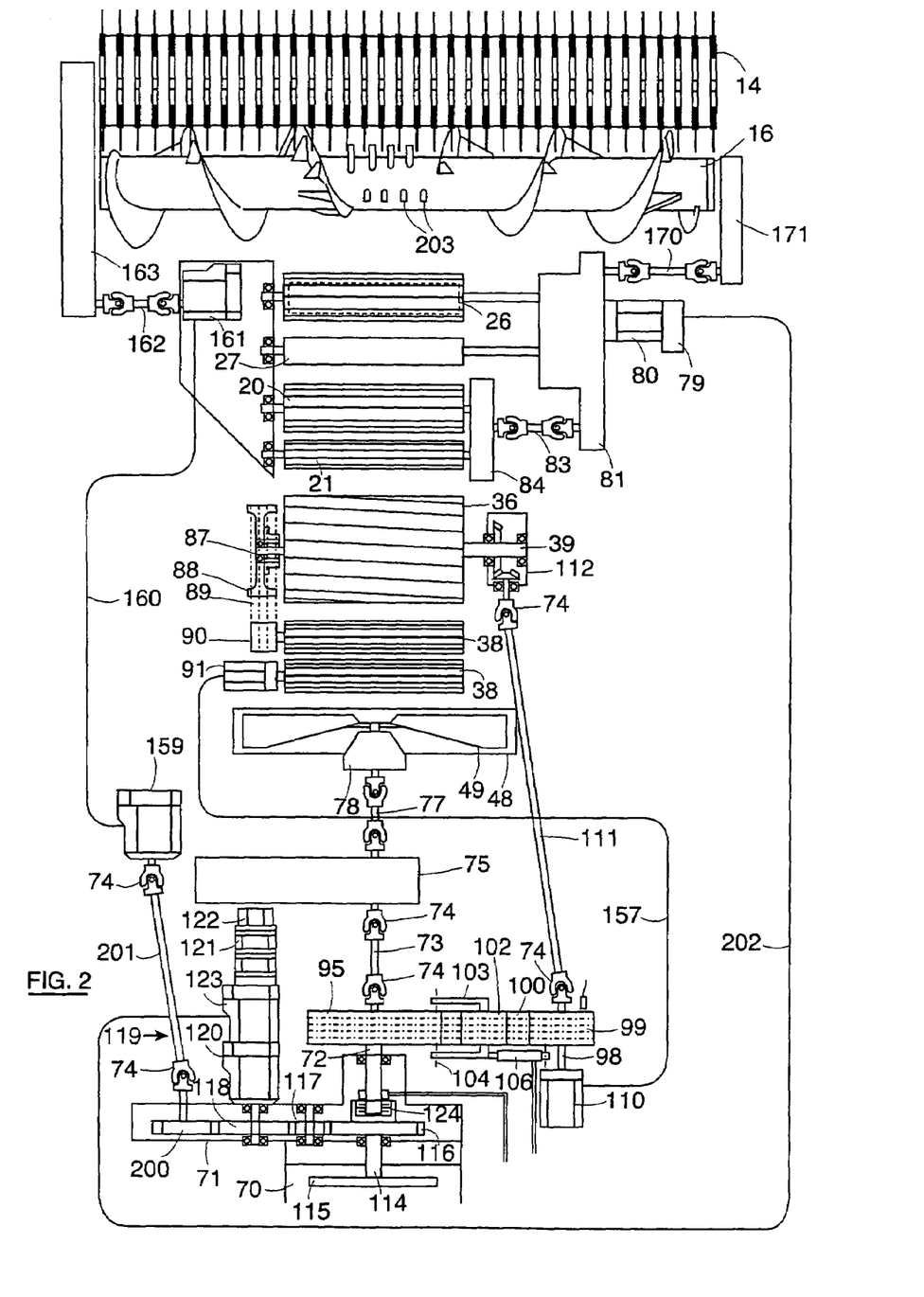
FIG. 2 is a schematic view of the drivelines of a forage harvester in accordance with embodiments of the present invention.
Figure 3:
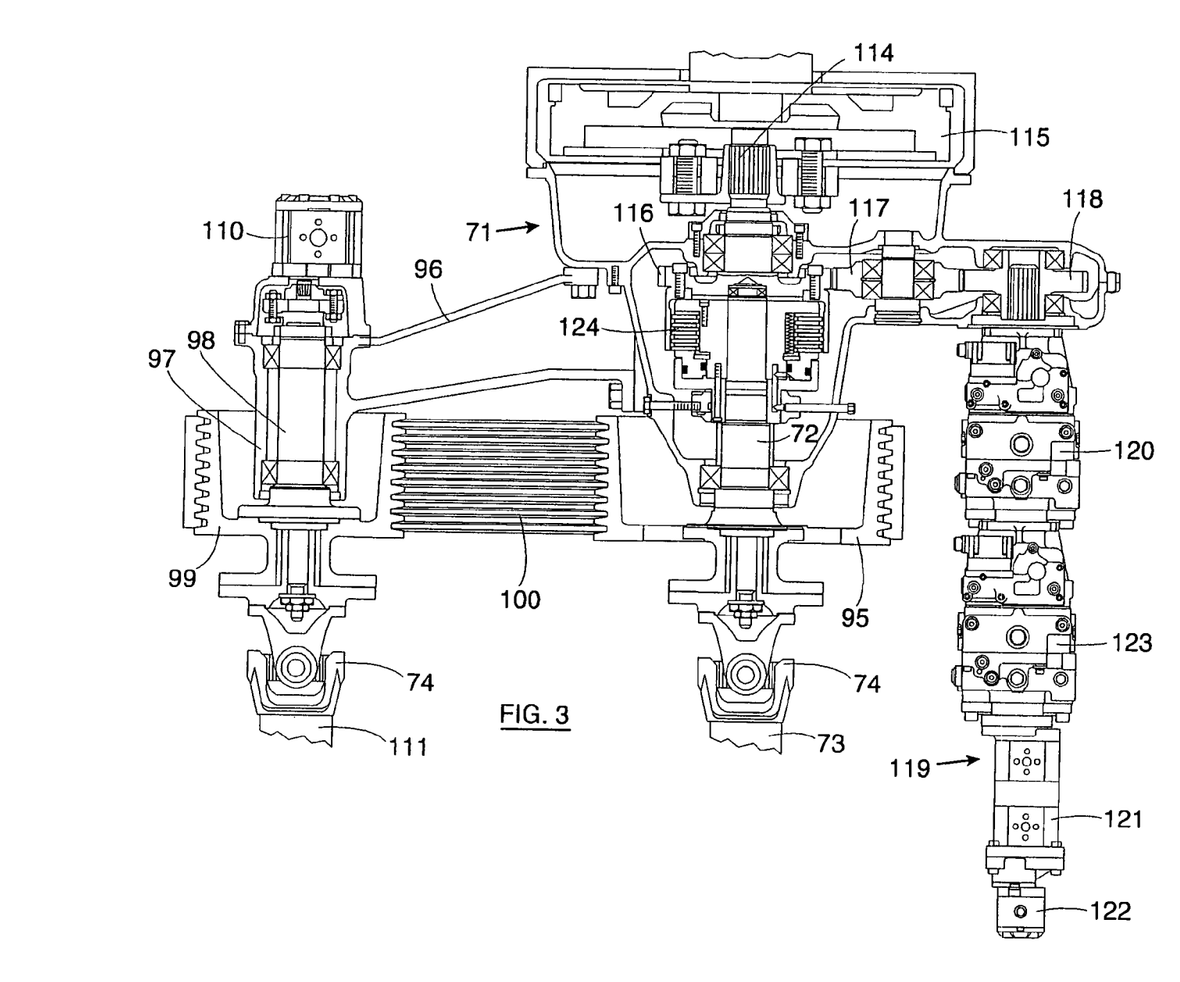
FIG. 3 is a sectional view of a power take off (PTO) assembly of a forage harvester that may be used with the present invention.

As shown in FIGS. 1, 2 and 3, the forage harvester is driven by a power plant/prime mover in the form of an engine 70, which is drivingly connected to a power-take-off (PTO) gearbox 71. The output shaft 72 of the PTO gearbox 70 is linked to a universal joint 74 of a drive shaft 73, whereof another universal joint 74 is linked to a transmission 75. An output shaft of the transmission 75 is connected to a blower drive shaft 77, which drives a blower gearbox 78 which supports and rotates the blower rotor 49 installed within the blower housing 48.

As depicted in FIG. 3, the output shaft 72 of the PTO gearbox 71 carries a grooved PTO pulley 95, to which the universal joint 74 of the drive shaft 73 is mounted. An arm 96 of a bearing housing 97 is attached to the right hand side of the PTO gearbox 71. In the bearing housing 97 a shaft 98 is rotated, which carries a pulley 99 at its front end. A transmission belt 100, running over both pulleys 95, 99, can be tensioned using an inner idler roll 102, which is rotated in an idler arm assembly 103, which is pivoted about a journal 104, extending from the PTO gearbox 71. The idler roll 102 is loaded by a hydraulic cylinder 106, which is installed between the bearing housing 97 and a protrusion of the idler arm assembly 103.

A hydraulic gear motor 110 is mounted onto the rear of the bearing housing 97 and its output shaft is coupled to the rear end of the shaft 98. A cutterhead drive shaft 111 is connected with a universal joint 74 to the front of the pulley 99. The other end of the drive shaft 111 is connected by another universal joint 74 to the input shaft of an angle transmission 112, which drives the cutterhead axle 39.

The PTO gearbox 71 comprises a PTO input shaft 114, which is coupled at its rear end to the flywheel 115 of the engine 70 and at its front end to a first spur gear 116, meshing with a second spur gear 117. The latter gear 117 drives a third spur gear 118, which receives the input shaft of a hydraulic pump assembly 119, comprising a swash plate pump 120, which provides driving power to the traction wheels 2, a second swash plate pump 123 and gear pumps 121, 122. Spur gear 118 drives a fourth spur gear 200 (not represented in FIG. 3). This fourth spur gear 200 drives a swash plate pump 159 via a drive shaft 201 and universal joints 74.

The PTO input shaft 114 is linked to the PTO output shaft 72 by means of a hydraulically actuated clutch 124. When fluid pressure is applied thereto, the clutch 124 becomes engaged and the output shaft 72 is rotated unitarily with the input shaft 114.

The drivelines are illustrated schematically in FIG. 2. A first drive line portion comprises a cutterhead drive shaft 111, an angle transmission 112, a cutterhead axle 39, an overrun clutch 87 and a belt transmission, comprising a pulley 88, an upper crop processor pulley 90 and a transmission belt 89. The pulley 90 on upper crop processor roll 38 is driven by belt 89. A second drive line portion comprises a drive shaft 73, a transmission 75, and a blower drive shaft 77 and gearbox 78. A third drive line portion comprises a first drive mechanism in the form of a hydraulic swash plate pump 159, hydraulic circuitry 160, a hydraulic motor 161, a drive shaft 162, and a first gathering means transmission 163. A fourth drive line portion comprises a second drive mechanism in the form of a swash plate pump 123, hydraulic circuitry 202, hydraulic motor 80, an arrest or stop valve 79, a lower feedroll transmission 81, a drive shaft 83, an upper feedroll transmission 84, a drive shaft 170 and an auger transmission 171. The lower processor roll 38' may be driven by a further driveline portion, comprising the bi-functional gear motor 110, hydraulic circuitry 157 and a hydraulic motor 91, as explained in GB-9930743.1 and in EP 1156712. During normal operation the motor 110 is driven and acts as a pump. When the cutterhead 36 has to be reversed (e.g. for sharpening the knives) the motor 110 is driven by oil from valve 153 (see FIG. 4).

The first drive line portion is connected to the second by means of the main belt transmission, comprising the sheaves 95, 99 and the belt 100. It can be disconnected therefrom by releasing the pressure from the hydraulic cylinder 106 which then retracts under action of the belt 100 and the idler roll 102. The belt 100 is set loose and disengages from the grooves of the pulleys 95, 99. The first and second drivelines can be connected to and disconnected from the engine 70 by means of the hydraulic clutch 124. Meanwhile the hydraulic pump assembly 119 remains constantly driven by the engine 70 through the gears 116, 117 and 118.

Swash plate pump 123 of the fourth drive line portion/ second drive mechanism is used to drive the hydraulic motor 80 driving a lower feedroll transmission 81. The motor 80 is provided with an arrest valve 79 which is operable to cut oil flow and stop the motor 80 instantaneously when the system detects a foreign object in the crop flow. The transmission 81 is common to the intake elements 20, 21, 26, 27 and to the auger 16. This common transmission 81 is connected directly to the lower feedrolls 26, 27 and through a drive shaft 83 and an upper feedroll transmission 84 to the upper feedrolls 20, 21. The lower feedroll transmission 81 is connected through a drive shaft 170 and an auger transmission 171 to the auger 16. In this manner, the transmission is shared between the intake elements 20, 21, 26, 27 and the auger 16 and splits its input drive into two output drives, one for the intake elements 20, 21, 26, 27 and one for the auger 16. There is a fixed ratio between the speed of the feedrolls 20, 21, 26, 27 and the speed of the auger 16. If feedrolls 20, 21, 26, 27 and auger 16 are turning at a speed such that the effective circumferential speeds of the devices are the same, then there is a reduced chance of accumulation of material in front of the feedrolls 20, 21, 26, 27, along with a reduced chance of irregular crop intake and consequent material loss. The effective feedroll speed lies somewhere in between the speed of the cylinder surface and the speed of the slat tips of the feedrolls and the ratio in which the input drive to the common transmission 81 is split should be such that the rate at which the auger 14 operates is matched a predetermined and optimized rate of crop throughput of the intake elements 20, 21, 26, 27. The second gathering element, the auger 16 in the embodiment of FIG. 2, and the intake elements, the feedrolls 20, 21, 26, 27 in the embodiment of FIG. 2, behave like a continuous conveyor since all effective circumferential speeds are linked to each other. This results in a smoother feeding, allowing higher input speeds on the forage harvester and higher capacity.

On wide augers 16, the effective speed of the crop is determined for the larger part by the pitch of the auger flights. On shorter augers 16, the effective speed results for the larger part from the effective diameter of the auger tube. Usually, the central portion of the auger is provided with retractable fingers 203 of which the rearward movement determines the crop speed adjacent the intake mouth of the harvester.

With regard to the first drive mechanism, it may be in the form of a hydrostatic drive and enables continuous variations in the speed at which the first gathering element is driven, such variations being made independently of the rate at which the auger 16 and feedrolls 20, 21, 26, 27 are driven. To this end, hydraulic motor 161 is connected to hydraulic pump 159 by means of hydraulic circuitry 160 and is connected through a drive shaft 162 and a first gathering means transmission 163 to the first gathering element 14. In FIG. 2 this element is constituted by a pick-up reel which is provided with a plurality of flexible pick-up tines. That way, the first gathering means is driven independently from the auger 16 and the feedrolls 20, 21, 26, 27. There is no fixed speed ratio between the first gathering element 14 and the second gathering element 16.

Preferably, the speed of the first gathering element 14 is controlled so that it varies in relation to the forward speed of the harvesting machine: the higher the forward speed of the harvesting machine, the higher the speed of the first gathering element 14. A control unit is provided to control the position of the swash plate of pump 159 and hence the speed of the first gathering element 14. In order to change the speed of the first gathering element 14 as a function of the forward speed of the harvesting machine, according to a first embodiment, an indirect measurement of the forward/ ground speed may be provided by a sensor in the main gearbox that is driving the front wheels or by a wheel speed sensing arrangement, which sensing gives a measure for the forward speed and accordingly provides a signal to the drive of the first gathering element 14. According to a second embodiment, a direct measure of the ground speed may be provided by a radar speed measurement directly on the ground. Again this sensor provides a signal to the drive of the first gathering element 14 according to the forward speed measured.

Figure 4:
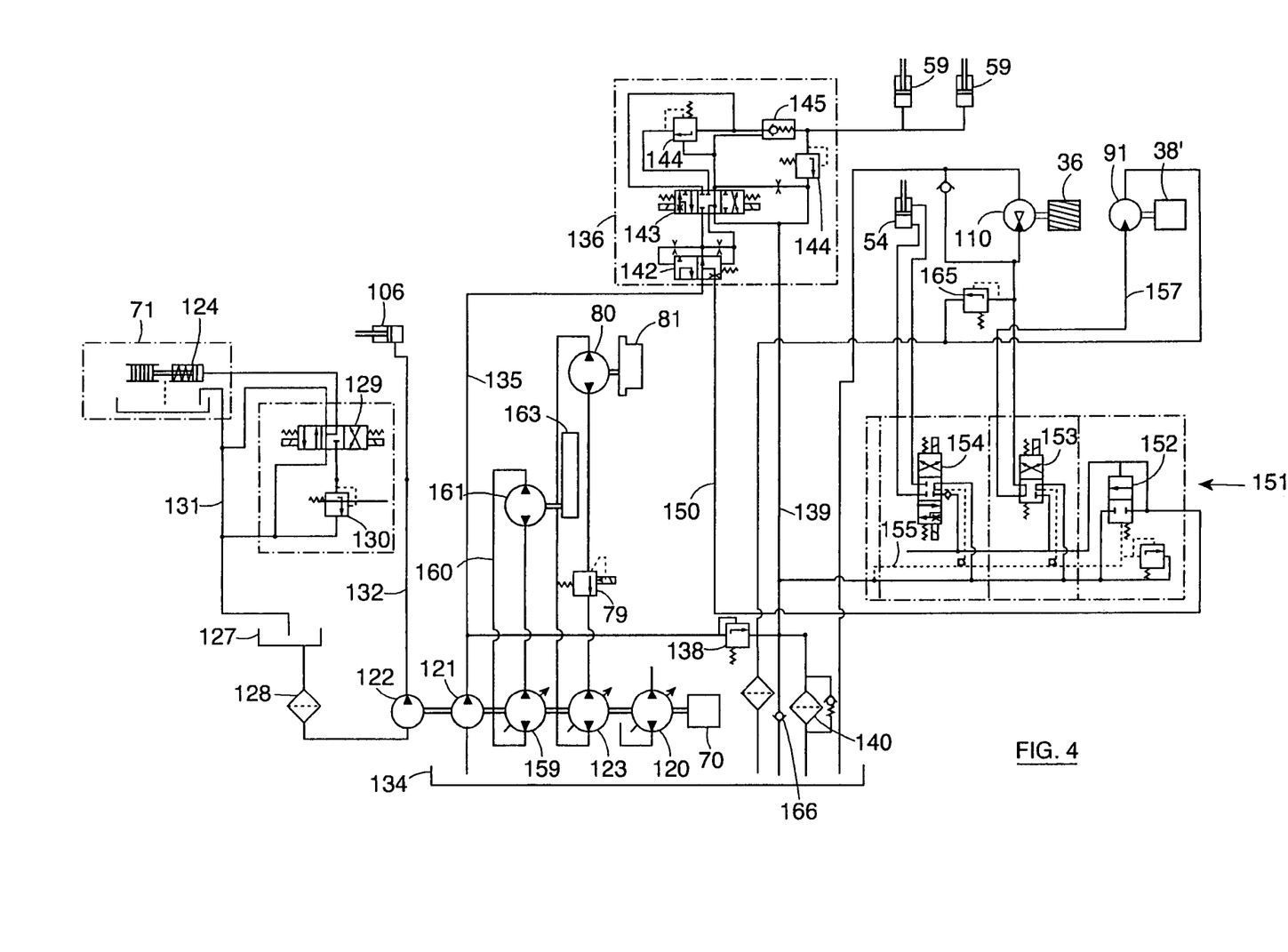
FIG. 4 is a schematic representation of part of a hydraulic circuit in accordance with an embodiment of the present invention.

A portion of the hydraulic control system is schematically represented in FIG. 4. When the engine 70 is running, the hydraulic gear pump 122 draws oil from a shunt tank 127 through an oil filter 128 and feeds it via a hydraulic feed line 132 to a solenoid operated control valve 129 and the hydraulic cylinder 106 of the main belt transmission. One output port of the valve 129 is connected to the hydraulic clutch 124, the other is connected to the return line 131, which ends in the shunt tank 127.

Immediately after the start of the engine 70, the valve 129 is still in its rest position, as shown in FIG. 4, and the feed line 132 is pressurized, as to extend the cylinder 106. The pressure level is controlled by a relief valve 130, which is equally linked to the feed line 132. The position of the valve 129 is controlled by an electrical circuit (not shown), comprising a programmable control unit, such as a microprocessor.

In order to engage the hydraulic clutch 124, the valve 129 is shifted to the right so that the pressure from feed line 132 is applied to the piston of the clutch 124. Only a small amount of leakage oil drips from the clutch into the PTO gearbox 71, which is also connected to the return line 131. The feed line 132 and the cylinder 106 remain pressurized. Consequently, both the first and second driveline portions are driven by the engine 70.

The hydraulic oil from the clutch 124 also serves as a lubricant to the bearings and the gears 116, 117, 118 in the gearbox 71. Thereby most of the oil is mixed with air and divided over the inner surface of the gearbox 71, which makes the latter unsuitable for use as a tank, from which the oil may be drawn by the gear pump 122. Therefore the surplus oil is delivered to the shunt tank 127, where it can settle before it is fed to the gear pump 122.

When the valve 129 is shifted to the left, the feed line 132 is connected to the return line 131, so that the pressure in the feed line 132 drops and the hydraulic clutch 124 disengages. Simultaneously the hydraulic cylinder 106 retracts under the action of the transmission belt 100, so that the first drive line portion, comprising the cutterhead drive shaft 111, is disconnected from the second drive line portion. When the control valve 129 is shifted back to the right in order to re-engage the clutch 124, it passes through the middle position, in which only the cylinder 106 is pressurized. The idler roll 102 thus is loaded before the clutch 124 starts to rotate the PTO pulley 95. This operating sequence prevents unnecessary slippage of the belt 100, so that its lifetime will be extended.

The engine 70 is equally driving the gear pump 121, which draws hydraulic oil from an oil tank 134 and feeds it via another feed line 135 to a valve assembly 136, which controls the oil flow to the hydraulic lift cylinders 59 between the cutterhead frame 34 and the main frame 1. The feed line 135 is protected against overpressure by a pressure relief valve 138, which is connected to a return line 139, which feeds the return oil through a filter 140 to the oil tank 134.

The valve assembly 136 comprises a slave valve 142, which is hydraulically controlled by a solenoid operated control valve 143, and two pressure relief valves 144. The electrical circuit, which controls the clutch valve 129, equally controls the valve 143. When the latter is in its rest position, as shown in FIG. 4, oil pressure will be built up at the left side of the slave valve 142, which consequentially shifts to the right and connects the feed line 135 to a feed line 150 of a stack valve 151. When a solenoid of the valve 143 is energized to shift the latter to the right, equal oil pressure will build up on both sides of the slave valve 142, which then will be shifted back by a spring to the position shown in FIG. 4. Oil from the feed line 135 is supplied through the valves 142, 143 and a non-return valve 145 to the hydraulic lift cylinders 59, which extend to lift the attachment 10. When the other solenoid of the control valve 143 is energized to shift the same to the left, oil pressure is provided to the non-return valve 145, which opens to let oil flow from the cylinders 59 to the valve 143 and therefrom to the return line 139, whereby the cylinders 59 retract and the cutterhead frame 34 and the attachment 10 are lowered.

The engine 70 is also driving the swash plate pump 159. This pump 159 drives hydraulic motor 161 over hydraulic circuitry 160. The hydraulic motor 161 drives the first gathering means transmission 163 and this arrangement is in the form of a continuously variable speed drive under the control of the control unit.

The engine 70 equally drives swash plate pump 123 used to drive the hydraulic motor 80 of the feedroll transmission 81. The motor 80 is provided with an arrest valve 79 which is operable to cut oil flow and stop the motor 80 instantaneously when the system detects a foreign object in the crop flow. It can thus be seen that, by providing drive to both pumps 159, 123, the engine 70 is a common prime mover for the first gathering element 14 and the associated second gathering and intake elements 14, 20, 21, 26, 27.

Swash plate pump 120, also driven by the engine 70, is used for the forward movement of the harvester. It is connected to a hydrostatic motor (not shown) on the gearbox of the traction wheels 2.

The stack valve 151 controls a plurality of hydraulic devices, whereof only a few are depicted. The feed line 150 is received at a distributor valve 152, to which at least one solenoid operated control valve 154 is mounted. It is electrically connected to the electrical circuit mentioned above. When said valve 154 is in its rest position, as shown in FIG. 4, the oil pressure in the feed line 150 pushes the valve 152 downwardly, as to connect the feed line 150 to the return line 139. When any of the solenoids of the valve 154 is energized to shift the latter up or down, oil pressure will be provided to a control line 155 and the distributor valve 152 is shifted upwardly as to divert the oil flow from the return line 139 to the actuated valve.

The solenoid-operated valve 154 is linked to the hydraulic cylinder 54 of the spout 52. When the valve 154 is shifted upwardly, the cylinder 54 will extend as to raise the spout 52. When it is shifted down, the cylinder 54 will retract as to lower the spout 52.

The solenoid-operated valve 153 is linked to the hydraulic pump 91 by means of the hydraulic circuitry 157. The hydraulic pump 91 is drivingly linked to the lower crop processor roll 38'. Valve 153 is also linked to the hydraulic gear motor 110, which is drivingly linked to the cutterhead 36 by means of the cutterhead drive shaft 111.

When the valve 153 is in its rest position, as shown in FIG. 4, hydraulic gear motor 110 acts as a pump and drives the hydraulic pump 91, which drives the lower crop processor roll 38'. The cutterhead 36 is rotated in its normal operation sense (that is to comminute crop material; according to arrow F in FIG. 1) by the engine 70, the PTO gearbox 71, the main belt transmission, cutterhead drive shaft 111, angle transmission 112 and cutterhead axle 139. The gear motor 110 is also driven by the same driveline. When the solenoid operated valve 153 is shifted downwardly (by energizing the solenoid of the valve 153), the rotation of the gear motor 110 is reversed. Oil from the feed line 150 to the gear motor 110 drives the latter to rotate the cutterhead 36 in a sense opposite to the normal operation sense as indicated by arrow F in FIG. 1.

The hydraulic line between the motor 110 and the pump 91 is protected by a pressure relief valve 165.

While the invention has been shown and described with reference to preferred embodiments, it will be understood by those skilled in the art that various changes are modifications in form and detail may be made without departing from the scope and spirit of this invention. In particular, the invention does not only include forage harvesters, but also combine harvesters.

The invention claimed is:

1. An agricultural harvesting machine comprising:
a first gathering element adapted to be driven by a first drive mechanism so as to gather crop and to feed said crop in a direction substantially opposite to a direction of motion of said harvesting machine;
a second gathering element adapted to receive said crop from said first gathering element and adapted to be driven so as to transfer said crop in a direction substantially transverse to said direction of motion;
a control unit configured to measure the ground speed of the agricultural harvesting machine, said control unit adapted to automatically vary the rate at which said first gathering element is driven by controlling said first drive mechanism, wherein the speed of said first gathering element is exclusively dependent on said control unit such that the speed of said first gathering element varies in relation to the ground speed of the agricultural harvesting machine; and
intake elements being adapted to receive said crop from said second gathering element; wherein said second gathering element and said intake elements are driven at related rates and said first gathering element is driven at a rate independent from a driven rate of said second gathering element, and said intake elements.

2. The machine according to claim 1 further comprising a crop processing device adapted to be fed with crop from said intake elements.

3. The machine according to claim 2, wherein said first drive mechanism comprises a continuously variable speed drive.

4. The machine according to claim 3, wherein said second gathering element and said intake elements are adapted to be driven by a second drive mechanism through a common transmission.

5. The machine according to claim 4, wherein said common transmission splits a drive input from said second drive mechanism into a first output drive supplied to said intake elements and a second output drive supplied to said second gathering element, said split preferably being made in a substantially fixed ratio.

6. The machine according to claim 5, wherein said drive input is split in a ratio at which a rate of operation of said second gathering element is matched to a predetermined rate of crop throughput of said intake elements.

7. the machine according to claim 6, wherein each said drive mechanism comprises a motor and the power supply to each said motor is independent of the power supply to the other said motor.

8. The machine according to claim 7, wherein each said motor comprises a hydraulic motor and each said power supply comprises a hydraulic drive pressure supplied from an operably independent pump stage.

9. The machine according to claim 1, wherein said first gathering element is a row crop harvesting unit.

10. The machine according to claim 1, wherein said second gathering element is an auger.

11. The machine according to claim 1, wherein said intake elements comprise at least a pair of feedrolls.

12. The machine according to claim 1, wherein said control unit maintains no predetermined speed ratio between said first gathering element and the ground speed of the agricultural harvesting machine.

13. A method of operating an agricultural harvesting machine or a header attachment thereof, including:
using a first gathering element to gather crop and to feed said crop in a direction substantially opposite to a direction of motion of said first gathering element:
receiving said crop from said first gathering element at a second gathering element and driving said second gathering element so as to transfer said crop in a direction substantially transverse to said direction of motion;
measuring the ground speed of the agricultural harvesting machine using a control unit, said control unit operatively coupled to said first gathering element;
varying the rate at which said first gathering element is driven in relation to the ground speed of the agricultural harvesting machine, wherein the rate at which said first gathering element is driven is exclusively dependent on the ground speed measurement by said control unit;
driving said first gathering element at a rate which is independent from a rate at which said second gathering element is driven; receiving said crop from said second gathering element at a plurality of intake elements; and driving said intake elements at a rate related to the rate of driving said second gathering element.

14. The method according to claim 13, further comprises measuring the ground speed of the agricultural harvesting machine using a control unit coupled to a sensor in a gearbox which is driving front wheels of the agricultural harvesting machine.

15. The method according to claim 13, further comprises measuring the ground speed of the agricultural harvesting machine using a control unit coupled to a wheel speed sensor.

16. The method according to claim 13, further comprises measuring the ground speed of the agricultural harvesting machine using a control unit coupled to a radar speed sensor configured for ground speed measurements.

* * * * *